United States Patent
Baur et al.

(10) Patent No.: US 6,494,668 B2
(45) Date of Patent: *Dec. 17, 2002

(54) METHOD AND DEVICE FOR STACKING UNPACKED PROCESSED CHEESE SLICES

(75) Inventors: Wilhelm Baur, Gestratz (DE); Franz Hartmann, Weiler-Simmerberg (DE)

(73) Assignee: Natec, Reich, Summer GmbH & Co. KG (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/233,267

(22) Filed: Jan. 19, 1999

(65) Prior Publication Data

US 2001/0041130 A1 Nov. 15, 2001

(30) Foreign Application Priority Data

Jan. 20, 1998 (DE) .......................................... 198 01 878

(51) Int. Cl.$^7$ ............................................. B65H 15/02
(52) U.S. Cl. ................................. 414/789.2; 414/792.2; 414/791.3; 198/394; 198/397.02; 198/397.06
(58) Field of Search ........................... 196/394, 397.02, 196/397.03, 397.06; 414/789.2, 792.2, 791.3

(56) References Cited

U.S. PATENT DOCUMENTS

| 1,807,312 A | 5/1931 | Henley, Jr. | |
| 2,139,796 A | 12/1938 | Blosser | 198/35 |
| 2,706,053 A | 4/1955 | Doller | 214/7 |
| 2,905,341 A | 9/1959 | Anderson | 214/6 |
| 2,925,926 A | 2/1960 | Packman et al. | 214/7 |
| 2,989,195 A | 6/1961 | Dreyer | 214/6 |
| 3,180,481 A | 4/1965 | Brause | 198/167 |
| 3,288,266 A | 11/1966 | Bradley | 198/33 |
| 3,662,875 A | 5/1972 | Salomon | 198/180 |

(List continued on next page.)

FOREIGN PATENT DOCUMENTS

| CH | 339560 | 8/1959 | |
| DE | 1 970 462 | 10/1967 | |
| DE | 2527 035 | * 7/1976 | .............. 414/789.2 |
| DE | 2701028 | 8/1982 | |
| DE | 4 315 416 | 5/1993 | ........... B65G/15/14 |
| DE | 19503957 | 8/1996 | |
| DE | 19604926 | 8/1997 | |
| FR | 2 490 601 | 9/1980 | ........... B65G/47/08 |
| FR | 2490601 | 3/1982 | |
| FR | 2 683 213 | 11/1991 | ........... B65G/15/14 |
| GB | 1211594 | 11/1970 | |

*Primary Examiner*—Joseph A. Fischetti
(74) *Attorney, Agent, or Firm*—Whyte Hirschboeck Dudek SC

(57) ABSTRACT

A method and a device are disclosed for stacking unpacked processed cheese slices. Single stacks consisting of a plurality of superimposed processed cheese slices are continuously supplied by a transportation device to a first turning station. At the first turning station, the single stacks are individually rotated through 90° in the direction of transportation. These rotated single stacks subsequently are supplied to a second turning station. At the second turning station, two or more single stacks are arranged behind one another in a row and then are rotated together through 90° in the direction of transportation. Thus, the two or more single stacks come to rest on top of one another and form a multiple stack of processed cheese slices.

12 Claims, 4 Drawing Sheets

U.S. PATENT DOCUMENTS

| | | | |
|---|---|---|---|
| 3,675,792 A | 7/1972 | Griner et al. | 214/6 |
| 3,731,789 A | 5/1973 | Fleischhauer | 198/160 |
| 3,795,301 A * | 3/1974 | Sugitani | 198/20 R |
| 3,848,757 A | 11/1974 | Jordan | 214/152 |
| 3,850,314 A | 11/1974 | Runyan et al. | 214/6 P |
| 3,887,066 A * | 6/1975 | Houtsager | 198/285 |
| 3,895,982 A | 7/1975 | Persson | 156/71 |
| 3,904,077 A | 9/1975 | Luginbuhl | 221/175 |
| 3,956,518 A | 5/1976 | Goldbach | 426/518 |
| 3,974,921 A * | 8/1976 | Takuno | 214/7 |
| 4,103,786 A | 8/1978 | Tokuno | 214/7 |
| 4,141,193 A | 2/1979 | Joa | 53/529 |
| 4,176,993 A | 12/1979 | Luginbühl | 414/106 |
| 4,194,343 A | 3/1980 | Myers et al. | 53/493 |
| 4,255,584 A | 3/1981 | Hoffmann-Paquotte | 548/236 |
| 4,304,326 A | 12/1981 | Fowler | 198/623 |
| 4,346,800 A * | 8/1982 | Bennett et al. | 198/412 |
| 4,394,899 A | 7/1983 | Fluck | 198/408 |
| 4,599,025 A | 7/1986 | Borsuk et al. | 414/82 |
| 4,645,400 A * | 2/1987 | Mally et al. | 414/28 |
| 4,676,050 A | 6/1987 | Odenthal | 53/447 |
| 4,768,642 A | 9/1988 | Hunter | 198/425 |
| 4,824,307 A * | 4/1989 | Johnson et al. | 414/788 |
| 4,902,184 A | 2/1990 | Fritz | 414/790.3 |
| 5,065,857 A | 11/1991 | Lehtola | 198/457 |
| 5,114,307 A | 5/1992 | Meli et al. | 414/793.1 |
| 5,176,244 A | 1/1993 | Radzins et al. | 198/430 |
| 5,255,584 A | 10/1993 | Fakler | 83/94 |
| 5,331,874 A | 7/1994 | Foster et al. | 833/423 |
| 5,522,588 A * | 6/1996 | Soltysiak | 270/58.07 |
| 5,538,392 A * | 7/1996 | Leifeld | 414/98.2 |
| 5,547,004 A * | 8/1996 | Fransen | 198/419.3 |
| 5,687,833 A | 11/1997 | Dalessio, Jr. et al. | 198/786 |
| 5,733,099 A * | 3/1998 | Honneger | 414/788 |
| 5,823,318 A | 10/1998 | Baur et al. | 198/699.1 |
| 6,050,771 A * | 4/2000 | Dykstra | 414/795.8 |

\* cited by examiner

METHOD AND DEVICE FOR STACKING UNPACKED PROCESSED CHEESE SLICES

The invention relates to a method and a device for stacking unpacked processed cheese slices.

Devices for producing processed cheese slices are known, which supply individually packed and stacked processed cheese slices.

However, gastronomy and large consumers desire simple handling of the individual processed cheese slices, i.e. easily separable, but not individually packed processed cheese slices. Devices of this type for manufacturing unpacked, stacked processed cheese slices are known. A plurality of superimposed cheese webs are produced, which are continuously intermittently cut, resulting in individual stacks comprising a plurality of superimposed and unpacked processed cheese slices. Depending on the number of cheese webs which are simultaneously processed, this single stack can comprise, for example, 5, 10 or 20 individual processed cheese slices.

However, in many cases stacks comprising, for example, 30, 40 or more superimposed cheese slices may be required, so that to date this need has been met by manually stacking the single stacks coming from the machine to form larger multiple stacks. This manual activity is very monotonous, labour-intensive and costly.

It is therefore the object of the invention to propose a method and a device for stacking unpacked processed cheese slices, by means of which the stacking, which was formerly effected manually, is completely automated.

This object is attained by the characterising features of the independent claims.

The invention is based upon transporting the unpacked processed cheese slices, which have already been stacked into individual stacks during production, to a first turning station, where the individual stacks are tilted through 90° about their horizontal axis, so that they come to stand on their end face. The upright single stacks are transported to a second, pulsed turning station where they are grouped in a row. Once two or more single stacks have been arranged in a row in this manner, the second turning station is actuated and again tilts the grouped single stacks through 90° about their common horizontal axis. Consequently, the two or more stacks of processed cheese slices come to rest on top of one another and form a single multiple stack, which can be supplied to the further processing and packing of a subsequent processing station. As a transportation device, one or more conveyor belts are preferably used, which consist of a plurality of rotating belts.

The processed cheese slices thus leave the production machine already stacked into individual stacks and are stacked to form larger multiple stacks by the device according to the invention.

The processed cheese slices arriving from the production machine are preferably stacked on top of one another offset to the left and right in the direction of transportation in order to facilitate the removal of individual cheese slices from the stack. However, the end face of the individual stack which is to be stacked forms a plane, so that a flat standing surface is available.

According to a first embodiment of the invention, the first turning station is formed by a turnstile, which is arranged in the region of the conveyor belt and engages through said conveyor belt. The single stacks of cheese slices transported on the first conveyor belt are stopped by a vertically positioned arm of the turnstile, are individually grasped by the horizontal arm of the turnstile lying beneath the stack and rotated through 90° and deposited again on the conveyor belt. The respective turned single stack of cheese slices comes to rest upon its end face and is transported to the second turning station.

The turned individual stacks of cheese slices enter the region of the second turning station. The second turning station is preferably formed by a turnstile. The single stacks of cheese slices are transported by the conveyor belt to the vertical arm of the turnstile, where they abut and are arranged in rows of two or more. Once, depending on the desired number, two or more single stacks are arranged in a row, the turnstile is set in motion in the direction of transportation. The cheese slice stacks which have run up against the vertical arm of the turnstile are grasped by the underlying horizontal arm and rotated forwards through 90°, so that the two or more single stacks come to rest on top of one another on the conveyor belt and form a single multiple stack.

The multiple stacks of processed cheese slices are then advanced by the conveyor belt and supplied to a further processing or packing stage.

In connection with a second embodiment of the invention, the first turning station is formed by two transportation devices arranged in series and separated by an intermediate space. The transportation devices are preferably constructed as conveyor belts and are arranged vertically offset relative to one another, the first conveyor belt in the direction of transportation being arranged higher than the following conveyor belt. The single stacks of cheese slices fall from the first, higher conveyor belt onto the second, lower conveyor belt and during the fall rotate about the horizontal axis, so that they come to rest on the second conveyor belt tilted through 90° with their end face at the bottom. As a result of the fact that the individual, unpacked processed cheese slices adhere relatively well to one another, the individual processed cheese slices remain together even after tilting and do not fall apart. The following method steps in connection with the second turning station correspond to the steps described above in connection with the first embodiment.

In a further development of the present invention, it is provided that not only one row of successive single stacks can be processed, but the stacking device can simultaneously process a plurality of successive rows of single stacks.

The number of single stacks which are stacked on top of one another to form a multiple stack can be arbitrarily selected and is only limited by the steadiness of the multiple stack produced in this manner.

A station for batching the multiple stacks to form a plurality of successive units can be arranged downstream of the second turning station. In this respect, the batching station preferably comprises a plurality of lifters, which are arranged in series and lift the individually arriving multiple stacks from the conveyor belt for a given period of time and deposit said stacks again on the conveyor belt together as a batch.

A method for stacking unpacked processed cheese slices is contemplated, and includes the steps of continuously supplying stacks of superimposed processed cheese slices with a transportation device to a first turning station, tilting the stacks through a 90° angle in a direction of transportation, supplying the tilted stacks to a second turning station, and arranging at least two of the tilted stacks behind one another in a row, and tilting the at least two stacks together through a 90° angle in the direction of transportation such that the at least two stacks come to rest on top of one another to form a single stack of processed cheese slices.

The invention will be explained in further detail in the following with the aid of drawings illustrating a number of embodiments. In this respect, further features which are fundamental to the invention and advantages of the invention will be clear from the drawings and the description thereof. In the drawings.

Figure 1:
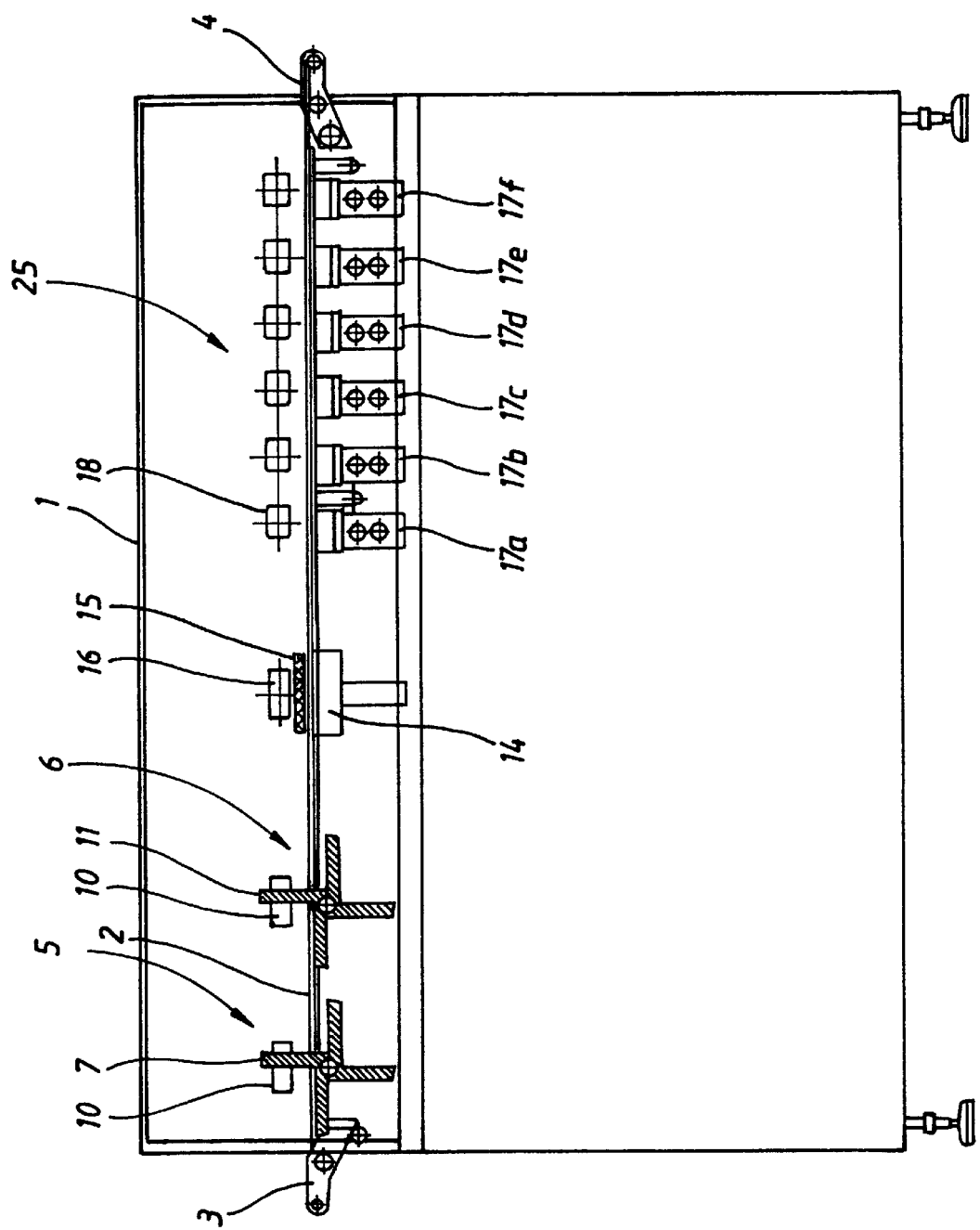
FIG. 1 is a schematic side view of a first embodiment of the stacking device according to the invention.
Figure 2:
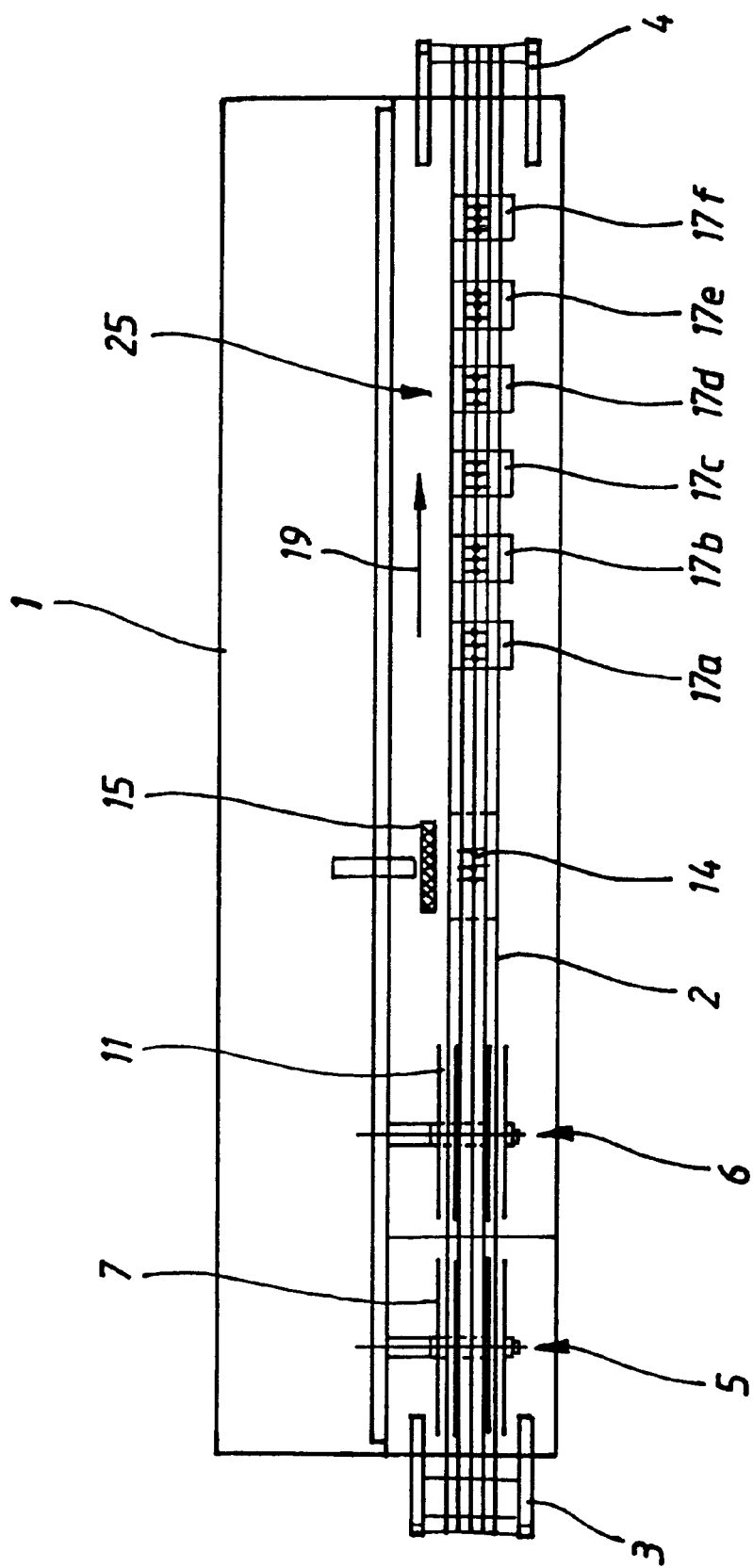
FIG. 2 is a plan view of the arrangement according to FIG. 1.
Figure 3:
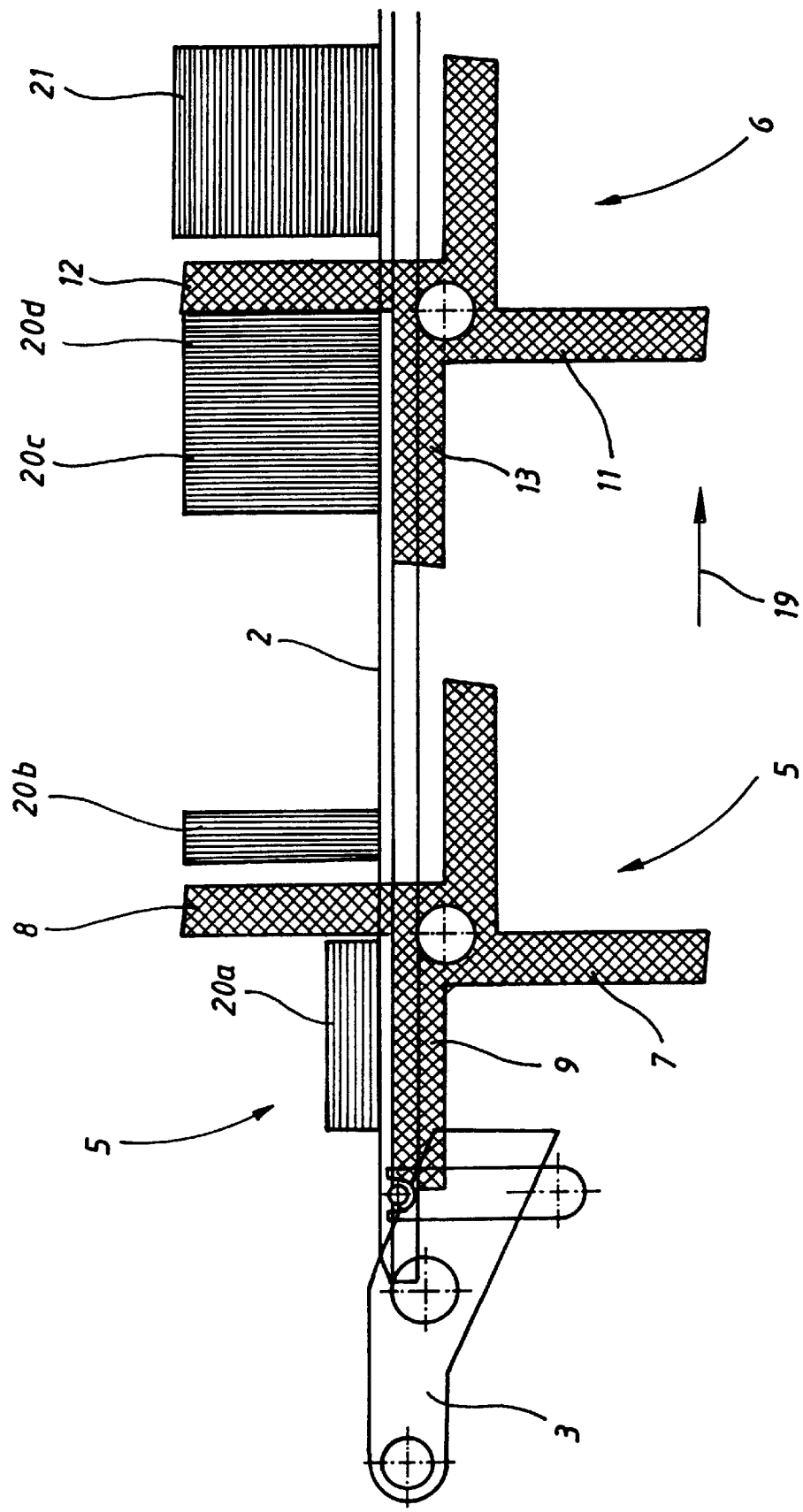
FIG. 3 is an enlarged view of the region of the turning stations in FIG. 1.

FIGS. 1 to 3 show a first embodiment of the stacking device, which is arranged on a machine housing 1. Extending along the housing is a conveyor belt 2, which is continuously guided over two reversing devices 3, 4. The single stacks of cheese slices are transported by the conveyor belt 2 in the direction 19, and reach the first turning station 5, which is formed by a turnstile 7. Here, the single stacks are rotated through 90° and reach a second turning station 6 formed by a turnstile 11, where they are retained to form a group and are again rotated through 90°, so that two or more single stacks come to rest on top of one another.

Details of the stacking process are shown in FIG. 3. The first turning station 5 comprises a turnstile 7, with four arms 8, 9 arranged offset through 90° on a horizontal axle. These arms 8, 9 are arranged in such a manner that they can engage through the plane of the conveyor belt 2 via corresponding intermediate spaces. In the inoperative position, one arm 9 of the turnstile 7 lies in the horizontal position level with the horizontal plane of the conveyor belt 2, and an adjoining arm 8 lies in the vertical position.

The single stacks 20a of cheese slices transported on the conveyor belt 2 are stopped by the vertically positioned arm 8 of the turnstile 7, are individually grasped by the arm 9 of the turnstile 7 lying beneath the stack 20a and are rotated through 90° and again deposited on the conveyor belt 2. The respective rotated single stack 20b of cheese slices comes to rest on its end face and is transported to the second turning station 6.

The single stacks 20c, 20d of cheese slices already turned by the first turning station 5 are advanced by the conveyor belt 2 and reach the region of the second turning station 6. The second turning station also comprises a turnstile 11 with four arms 12, 13 arranged offset through 90° on a horizontal axle. These arms 12, 13 are arranged in such a manner that they can engage through the plane of the conveyor belt 2 via corresponding intermediate spaces. In the inoperative position, one arm 13 of the turnstile 11 lies in the horizontal position level with the plane of the conveyor belt 2, and an adjoining arm 12 lies in the vertical position. The single stacks 20c, 20d of cheese slices are transported by the conveyor belt 2 to the vertical arm 12 of the turnstile 11, where they abut and are grouped in rows of two or more. Once, depending on the desired number, two or more single stacks 20c, 20d of cheese slices have been arranged in a row, the turnstile 11 is set in motion in the conveying direction 19. The cheese slice stacks 20c, 20d which have run up against the vertical arm 12 of the turnstile 11 are grasped by the underlying horizontal arm 13 and rotated forwards through 90°, so that the two or more single stacks again come to rest on the conveyor belt 2 on top of one another and form a single multiple stack 21. Arranged in the region of the turning stations 5, 6 are windows 10, through which the presence of cheese stacks can be monitored by means of sensors, so that the action of the turning stations can be controlled accordingly.

The multiple stacks 21 of processed cheese slices are then advanced by the conveyor belt 2 and supplied to a further processing or packing stage.

Figure 4:
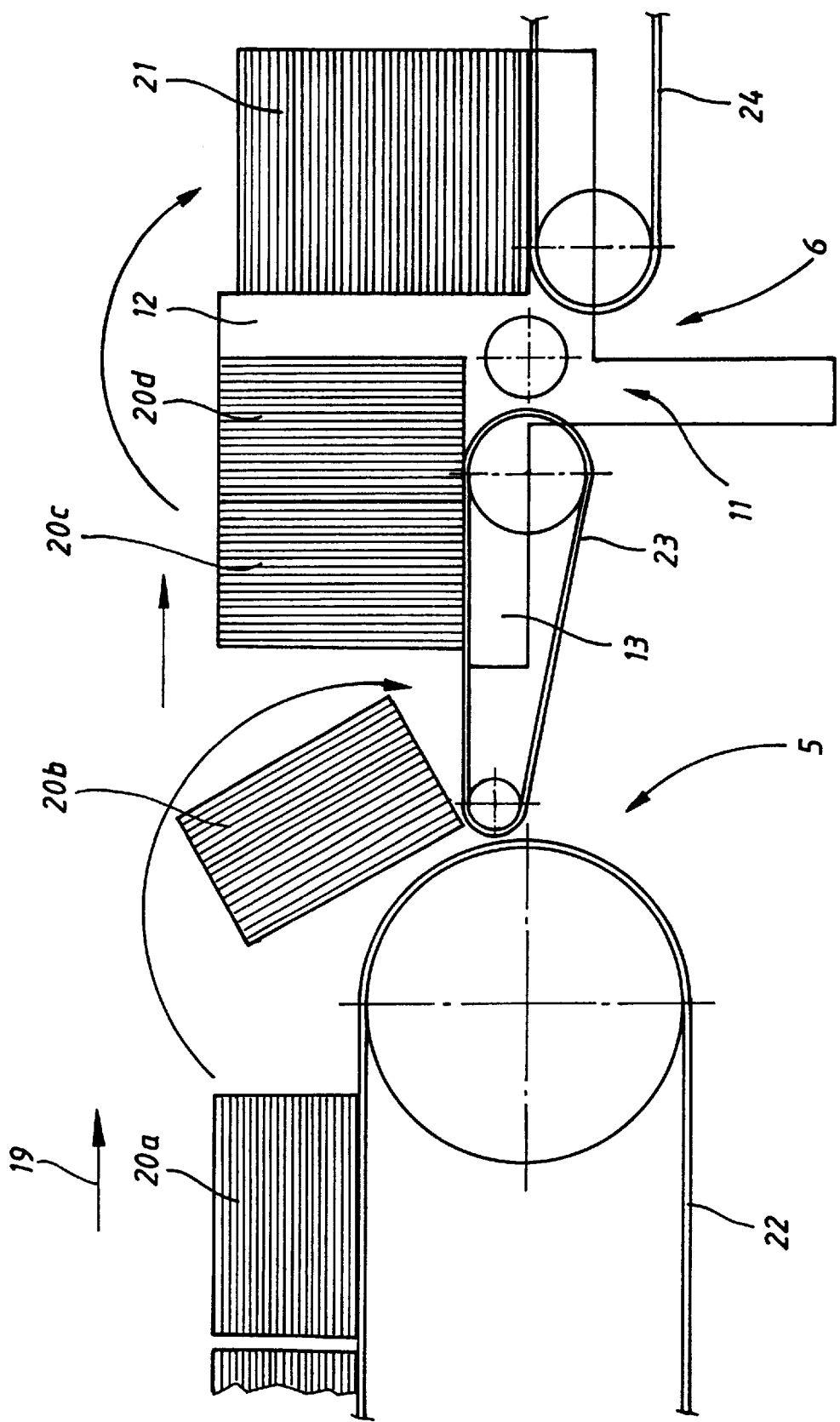
FIG. 4 is a schematic side view of a further embodiment of the stacking device according to the invention.

FIG. 4 shows a second embodiment of the invention. Instead of only a single conveyor belt, at least two conveyor belts 22, 23 are provided in this case. A first, continuously driven conveyor belt 22 can be seen, on which single stacks 20a of cheese slices arriving from the production machine are transported in the direction of the arrow 19. Arranged in series with the first conveyor belt 22 is a second, pulsed conveyor belt 23, which is separated from the first conveyor belt 22 by an intermediate space. The conveyor belts 22, 23 are vertically offset relative to one another, the first conveyor belt 22 in the direction of transportation 19 being arranged higher than the following conveyor belt 23. At the end of the first conveyor belt 22, the single stacks 20b fall from the first, higher conveyor belt 22 onto the second, lower conveyor belt 23 and during the fall rotate about their horizontal axis, so that they come to rest on the second conveyor belt 23 rotated through 90° with their end face at the bottom. The two conveyor belts 22, 23 thus form a first turning station 5.

The single stacks 20c, 20d of cheese slices, which have already been rotated by the first turning station 5, are advanced by the second conveyor belt and reach the region of the second turning station 6. This operates in an identical manner as already described in connection with FIGS. 1 to 3.

As can be seen from FIGS. 1 and 2, a lifter 14 is arranged downstream of the second turning station. A sensor monitors the formed multiple stacks 21 through the window 16 and sets the lifter 14 in action as soon as an improperly stacked multiple stack 21 is recognised. The multiple stack 21 is lifted from the conveyor belt 2 and removed by a ram 15 transversely to the direction of transportation.

Arranged downstream is a batching station 25, which arranges the individually arriving multiple stacks to form a plurality of successive units. The batching station 25 preferably comprises a plurality of lifters 17a–17f arranged in series, which lift the individually arriving multiple stacks 21 from the conveyor belt 2 for a given period of time and deposit them again on the conveyor belt 2 together as a batch. The lifters provide for the grouping of a batch (which includes a plurality of multiple stacks, the multiple stacks themselves comprising at least two single stacks). The lifters lift and deposit the multiple stacks together (i.e., along with, for instance, other multiple stacks) so as to form a batch. The grouping of the unpacked process cheese slices is changed by the lifters in that a batch is formed by stacking multiple stacks. The moment of arrival of the stack is monitored by sensors, which are arranged behind the windows 18. The lifters are preferably formed by pneumatically operated piston-cylinder units.

A third conveyor belt 24 can be arranged downstream of the batching station. The third conveyor belt 24 advances the multiple stacks 21 of processed cheese slices and supplies them to a further processing or packing stage.

LEGEND TO DRAWINGS 1 machine housing
2 conveyor belt
3 reversing device
4 reversing device
5 first turning station
6 second turning station
7 turnstile 8 arm, vertical
9 arm, horizontal
10 window
11 turnstile
12 arm, vertical
13 arm, horizontal
14 lifter
15 ram
16 window
17a–f lifter
18 window
19 conveying direction
20a–d single stack
21 multiple stack
22 conveyor belt
23 conveyor belt
24 conveyor belt
25 batching station

What is claimed is:

1. A method for stacking unpacked processed cheese slices comprising the steps of:
continuously supplying a stack of superimposed processed cheese slices with a transportation device to a first turning station;
tilting the stack trough a 90° angle in a direction of transportation to form a tilted stack;
supplying the tilted stack to a second ring station;
arranging at least two of the tilted stacks behind one another in a row to form a multiple stack,
tilting the multiple stack through a 90° angle in the direction of transportation to form a tilted multiple stack of processed cheese slices;
supplying the tilted multiple stack via a transportation device to a batching station to form a plurality of tilted multiple stacks; and
combining the plurality of tilted multiple stacks to form a batch at the batching station by:
lifting, from the transportation device, the plurality of tilted multiple stacks; and
depositing the tilted multiple stacks again onto the transportation device together as the batch.

2. The method according to claim 1 further comprising the step of arranging a plurality of transportation devices in series to perform the supplying step.

3. The method according to claim 1 further comprising the step of driving the transportation device in a pulsed fashion as a function of the operation of the second turning station.

4. The method according to claim 1 further comprising the step of the transportation device supplying the single stacks to a processing stage to pack the single stacks.

5. A method for stacking unpacked processed cheese slices, the method comprising:
supplying a stack of superimposed processed cheese slices in a direction of transportation to a first turnstile;
rotating the stack supplied from the first turnstile through about a 90° angle in the direction of transportation to form a rotated stack;
transporting the rotated stack in the direction of transportation to a second turnstile to form a multiple stack;
rotating, via the second turnstile, the multiple stack through about a 90° angle in the direction of transportation to form a rotated multiple stack;
supplying the rotated multiple stack via a transportation device to a batching station to form a plurality of rotated multiple stacks; and
combining the plurality of rotated multiple stacks to form a batch at the batching station by:
lifting, from the transportation device, the plurality of rotated multiple stacks; and
depositing the rotated multiple stacks again onto the transportation device together as the batch.

6. A method for stacking unpacked processed cheese slices in a device in combination with a plurality of unpacked processed cheese slices, the device comprising a transportation device comprising a conveyor belt to supply a stack of superimposed processed cheese slices in a direction of transportation, a first turning station in operative association with the transportation device to rotate the stack supplied from the transportation device through a 90° angle in a direction of transportation to form a rotated stack, and a second turning station in operative association with the transportation device such that the transportation device transports the rotated stack to the second turning station to a multiple stack, the second turning station grasping and rotating the multiple stack at through a 90° angle in the direction of transportation to form a rotated multiple stack; and a batch station arranged downstream of the second turning station, the batch station comprising a plurality of lifters arranged in succession, the method comprising:
supplying a stack of superimposed processed cheese slices in a direction of transportation to a first turnstile;
rotating the stack supplied from the first turnstile through about a 90° angle in the direction of transportation to form a rotated stack;
transporting the rotated stack in the direction of transportation to a second turnstile to form a multiple stack; and
rotating, via the second turnstile, the multiple stack through about a 90° angle in the direction of transportation to form a rotated multiple stack;
lifting, using a plurality of batch station lifters, the rotated multiple stack from a transportation device for a given length of time and then depositing the rotated multiple stack on the transportation device to form a batch.

7. The method according to claim 6 wherein the first turning station comprises a turnstile.

8. The method according to claim 6 wherein the transportation device comprises at least two conveyor belts arranged in series.

9. The method according to claim 6 wherein the first turning station comprises a first and a second transportation device, each spaced apart and vertically offset relative to one another.

10. The method according to claim 6 wherein the second turning station comprises a turnstile.

11. A method for stacking unpacked processed cheese slices in a device in combination with a plurality of unpacked processed cheese slices, the device comprising: (a) a first turning station capable of rotating a stack of unpacked processed cheese slices through a 90° angle as measured about a horizontal axis of the stack to form a rotated stack, (b) a second turning station capable of receiving and accumulating each rotated stack of unpacked superimposed processed cheese slices in a row from the first turning station to form a multiple stack and then rotating the multiple stack through a 90° angle; (c) at least one transportation device in transportation association with the first and second turning stations to transport the stack of unpacked processed cheese slices to the first turning station and to transport the rotated stack from the first turning station to the second turning station; wherein the first and second turning stations each comprise a turnstile having four arms offset by approximately 90° on a horizontal axle, the method comprising:

supplying a stack of superimposed processed cheese slices in a direction of transportation to a first turning station;

rotating the stack supplied from the first turning station through about a 90° angle in the direction of transportation to form rotated stack;

transporting the rotated stack in the direction of transportation to a second turning station;

accumulating each rotated stack of unpacked superimposed processed cheese slices in a row from the first turning station to form a multiple stack;

rotating, via the second turning station, the multiple stack through about a 90° angle in the direction of transportation to form a rotated multiple stack; and lifting, using a plurality of batch station lifters, the rotated multiple stack from the conveyor belt for a given length of time and then depositing the rotated multiple stack on the conveyor belt to form a batch.

12. The method according to claim 11 wherein the transportation device comprises a conveyor belt.

* * * * *

UNITED STATES PATENT AND TRADEMARK OFFICE
CERTIFICATE OF CORRECTION

PATENT NO. : 6,494,668 B2
DATED : December 17, 2002
INVENTOR(S) : Wilhelm Baur et al.

It is certified that error appears in the above-identified patent and that said Letters Patent is hereby corrected as shown below:

Column 5,
Line 25, replace "trough" with -- through --.
Line 27, replace "ring" with -- turning --.

Signed and Sealed this

Twenty-second Day of July, 2003

JAMES E. ROGAN
*Director of the United States Patent and Trademark Office*